United States Patent [19]

Harrison et al.

[11] 4,396,959

[45] Aug. 2, 1983

[54] DATA TRANSDUCER POSITION CONTROL SYSTEM FOR ROTATING DISK DATA STORAGE EQUIPMENT

[75] Inventors: Joel N. Harrison, Campbell; Donald V. Daniels, Santa Cruz; David A. Brown, Saratoga, all of Calif.

[73] Assignee: Quantum Corporation, Milpitas, Calif.

[21] Appl. No.: 190,198

[22] Filed: Sep. 24, 1980

[51] Int. Cl.³ .................... G11B 21/10; G11B 21/08; H02K 37/00

[52] U.S. Cl. ........................................ 360/77; 360/78; 310/49 R

[58] Field of Search ................... 360/77, 78; 310/49

[56] References Cited

U.S. PATENT DOCUMENTS

| | | | |
|---|---|---|---|
| 3,691,543 | 9/1972 | Mueller | 360/77 |
| 3,737,883 | 6/1973 | Sordello et al. | 360/78 |
| 3,864,741 | 2/1975 | Schwarz | 360/77 |
| 4,096,534 | 6/1978 | Brownback et al. | 360/78 |
| 4,103,314 | 7/1978 | Case | 360/78 |
| 4,135,217 | 1/1979 | Jacques et al. | 360/77 |
| 4,188,646 | 2/1980 | Sordello et al. | 360/77 |

OTHER PUBLICATIONS

H. P. Stickel, "New 50-Megabyte Disk Drive: High Performance and Reliability from High Technology Design", Aug. 77 *Hewlett Packard Journal*, pp. 2-15.

Shugart Associates, "8-Inch Fixed Disk Drive", Two page product bulletin dated 9/79.

*Primary Examiner*—Robert S. Tupper
*Attorney, Agent, or Firm*—David B. Harrison

[57] ABSTRACT

An improved apparatus and method is disclosed for controlling the position of one moveable member relative to another. In the disclosed preferred embodiment of a rotating disk memory system, the moving member is a head carriage structure and the other is a frame carrying a rotating data storage disk. From externally supplied position selectron information, and from internally determined polyphase position information, open loop position changing movements are determined and carried out in accordance with monitored incremental polyphase position information generated during the movement. When a destination location has been reached one or more servo systems close loop in order to maintain the moving member precisely at the newly commanded location. A rotor for moving the member is an aspect of the present invention.

28 Claims, 34 Drawing Figures

DATA TRANSDUCER POSITION CONTROL SYSTEM FOR ROTATING DISK DATA STORAGE EQUIPMENT

BACKGROUND OF THE INVENTION

This invention relates to position control systems and methods for translating one member relative to another, and more particularly, this invention relates to methods and apparatus for moving a memory data device member such as a transducer relative to another member such as a desired concentric track of a rotating disk, and keeping the moved member in desired alignment with the other member, e.g. the transducer in registration with the track.

In electromechanical devices such as the rigid rotating memory devices disclosed by the prior art, two basic approaches have been taken in order to position data transducers radially relative to the rotating magnetic disk surface. A first, high cost approach was to utilize a dedicated servo system with a servo head and a replicated servo surface on the disk to provide a high performance track-following transducer positioning scheme. On the other hand a more recent, low cost approach was to utilize completely open loop stepping motor positioners which operated to place the transducers at arbitrarily defined tracks without any actual position information being fed back from the disk to the head positioner. The main drawback of the prior art low cost open loop approach was the requirement that tracks be spaced far enough apart to take into account all of the variations of the system, including mechanical tolerances in the stepping motor actuator, thermal expansion of the disk, and disk run-out. The result was a disk drive product which, while effective as a low cost unit, lacked the data storage capacity of the more expensive units with the result that the cost of storage per bit stored of the low cost drives approached the same cost as the earlier, more expensive storage units.

SUMMARY OF THE INVENTION

One object of the present invention is to provide a novel apparatus for positioning one member such as a data transducer relative to another member, such as a rotating data storage medium.

Another object of the present invention is to provide a low cost closed loop servo control system which combines the best features of the prior art to improve the accuracy of maintaining a transducer in alignment with a data track during read and/or write operations of a disk having high data track densities.

A further object of the present invention is to provide an improved yet more reliable open loop position seeking system which overrides a closed loop position maintaining servo control when seeking from one position to another position.

Yet another object of the present invention is to provide a lightweight, substantially linear, pure torque driven transducer carriage for rapidly moving the transducer radially across the data tracks during track seeking operations and to maintain the transducer on track during data read and write operations.

A still further object of the present invention is to provide a unique single servo sector on the rotating disk which contains track centerline data capable of being read by the transducer and converted to an offset value to provide a fine adjustment to the head carriage in order to maintain the transducer at the centerline of the track during read and write operations.

Yet one more object of the present invention is to provide an improved, yet simplified high speed and pure torque producing position translator for positioning one member relative radially to another member.

One more object of the present invention is to combine readily available and inexpensive electrical and mechanical components in a unique way to provide an improved position control system which occupies a small physical space, which requires only a modest power supply, which is inexpensive to manufacture and which operates reliably over a long useful life.

These and other objects of the present invention are obtained in electromechanical equipment such as data storage systems which include a frame and a member such as a head support structure rotatably mounted to the frame and moveable relative to said frame among preselected available ones of a multiplicity of selectable positions such as concentric data tracks of a rotating data storage disk.

The moveable member includes a bidirectionally moveable electromechanical mover supported by said frame, A bidirectional mover driver is connected to the mover for moving the member to maintain it at a selected one of the positions during a maintained position mode of operation and to transport the member from a departure position to a destination position during a new position seeking mode of operation.

A position transducer provides a polyphase signal, such as quadrature, which is generated in response to actual sensed present position of the member relative to the frame.

A position controller is connected to the position transducer, said mover driver, and to an external source of new position selection information. The controller records the present position of the member relative to the frame; it calculates a new position seeking command in response to known present position and the new position selection information; and, it commands the member to move from the known present position to a requested destination position during a new position seeking mode of operation, by commanding at the mover a first spatial increment of maximum forward direction acceleration followed by a similar spatial increment of maximum reverse direction acceleration and then by commanding adaptively a slewing rate dependent upon incremental polyphase position information of the member provided by the position transducer until the destination position is reached.

A position-dependent closed loop servo is connected to the position transducer and to the mover driver for operatively controlling said driver to keep the member positioned within a selected one of the positions during the maintained position modes of operation, the loop being opened during accelerative portions of new position seeking modes of operation.

Another aspect of the present invention, particularly applicable to electromechanical systems such as rotating disk storage technology provides a fine position closed loop servo. It is connected to the driver and operates from prerecorded information in a single, data masked servo sector on a data surface of the rotating disk. This data is read by a head supported by the moveable member. A sample and hold circuit is connected to the head during its passes over the sector and holds the control data read therefrom. A correction signal generator, connected to the sample and hold circuit and to the driver generates and supplies an offset value which when applied to the driver promotes and maintains track centerline alignment of the head during read and/or write operations of the disk storage system. The fine position loop is overriden and ignored during accelerative portions of new position seeking modes of operation.

A rotor provides another aspect of the present invention, and it includes an even number of coil segments, which may be wound sequentially on a moving bobbin from a single strand of wire. The coil segments are arranged adjacently in a thin disk and are connected to provide bidirectional, symmetrical torque. Potting compound encapsulates the coil structure and provides a very high resonant frequency and a capability to absorb vibration energy from the rotatable member.

The method of the present invention practiced in the environment of electromechanical equipment such as data storage systems which include moving a member such as head support structure relative to a frame among preselected available ones of a multiplicity of selectable positions such as concentric data tracks of a rotating data storage disk, including the steps of:

moving the member electromechanically relative to the frame in order to maintain it at a selected one of the positions during a maintained position mode of operation and in order to transport the member from a departure position to a destination position during a new position seeking mode of operation, generating a polyphase signal, such as quadrature, in response to sensed actual present position of the member relative to the frame, receiving and storing new position selection information from an external position control source, recording the present position of the member relative to the frame, calculating a new position seeking command in response to known present position and the new position selection information, commanding the member to move from the known present position to a requested destination position during a new position seeking mode of operation by commanding a first spatial increment of maximum forward direction acceleration, then commanding a similar spatial increment of maximum reverse direction acceleration, then commanding adaptively a position crossing slewing rate dependent upon incremental polyphase information of the member provided by the step of generating the polyphase signal until the destination position is reached, and then stopping and holding said member at said destination position until the next position changing movement is commanded, and serving upon said generated polyphase signal for operatively maintaining the member positioned within a selected one of the positions during the maintained position mode of operation, and opening up the servo loop during accelerative portions of new position seeking modes of operation.

The invention, includes as other aspects thereof in a data storage disk device the further step of:

providing a single, data masked servo sector on a data surface of the disk, prerecording track centerline servo control data in the servo sector, reading the servo data with a head passing adjacent to the disk surface containing the control sector, sampling and holding the read servo data, generating an offset correction signal, applying the offset signal to move the member so as to maintain and promote centerline alignment of a data transducer head carried on the member with each selected concentric data track during read and/or write operations, to provide a fine position servo control loop, and overriding the loop during accelerative portions of the track seeking operations.

Other objects, advantages and features of the invention will be apparent to those skilled in the art from a consideration of the following detailed description of a preferred embodiment, presented in conjunction with the accompanying drawings.

DESCRIPTION OF A PREFERRED EMBODIMENT

Figure 1:
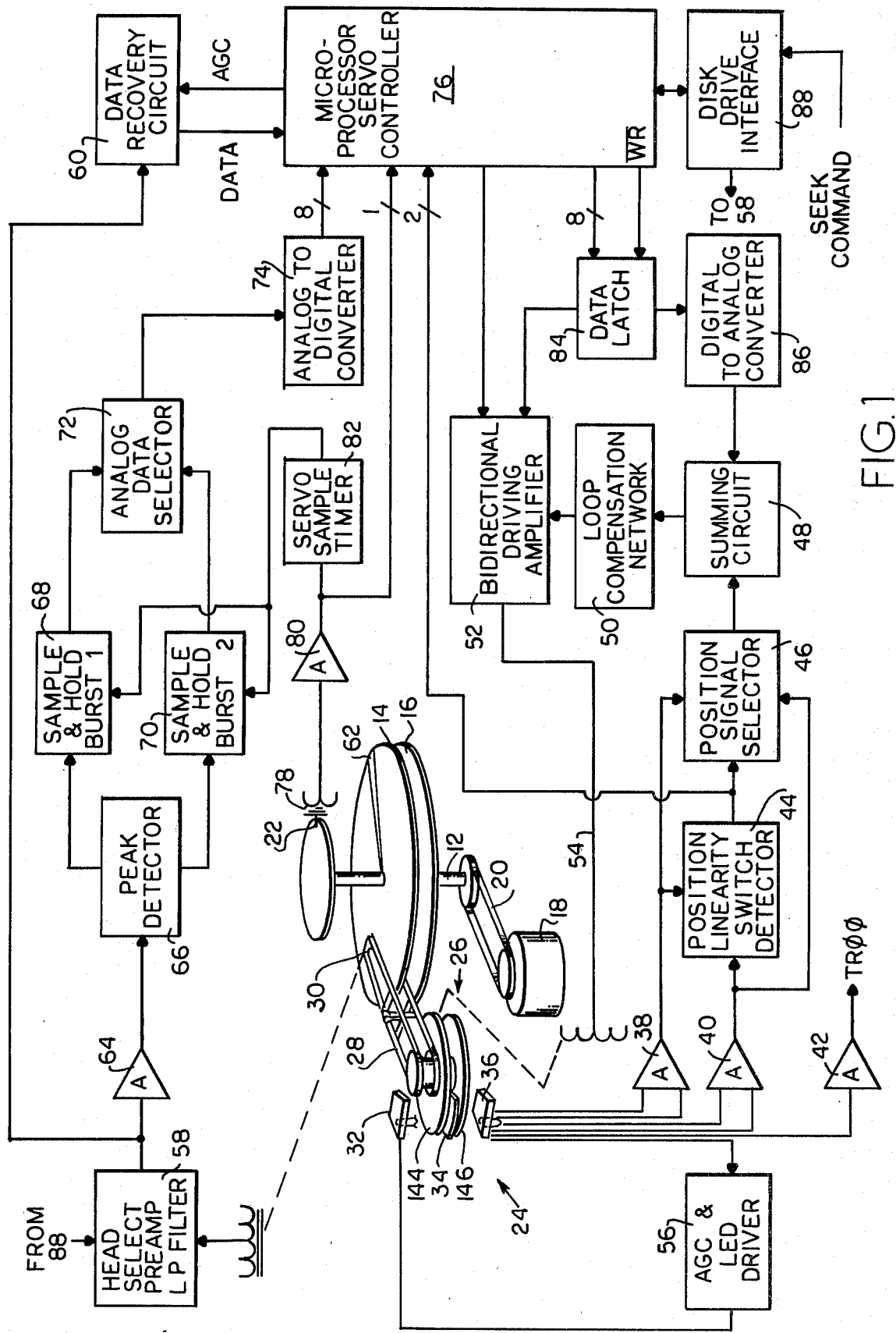
FIG. 1 is an overall system block diagram illustrating the principles of the present invention.

Referring to FIG. 1, the hard disk memory system 10 illustrated in overview therein is one in which a drive spindle 12 and one to four approximately eight inch diameter magnetic disks (two disks 14 and 16 are depicted) are caused to rotate about the common axis of the spindle at e.g. 50 Hz by a suitable disk drive motor 18 with pulleys and a drive belt 20 in conventional fashion. The system 10 may include as many as four or more magnetic disks, and disk diameters such as fourteen or five and one quarter inches are useable, although eight inches is presently preferred. The disks 14 and 16 may be formed from thin aluminum sheet having an oriented ferric oxide or other suitable magnetic coating on the major surfaces thereof. While magnetic surface disks are described, the present invention may be effectively utilized with other kinds of data storage devices, including laser etched disks or optical storage devices. An index marker 22 provided on the spindle (FIG. 9) is used to provide a tachometer or index clock signal which is used to control servo operations in a manner to be described shortly and which also serves as a check to assure that the disks are rotating at the desired 50 Hz angular velocity.

A head carriage assembly 24 includes a pure-torque-generating rotor 26 to which head support beams 28 are mounted for radial movement relative to the disks 14,16. The rotor 26 is described in greater detail hereafter in connection with FIGS. 9-12. Read or write transducers (heads) 30 are secured at the periphery of the support beams 28, and these heads may be of the type which ride upon an air bearing effect in accordance with what has come to be known in the art as Winchester technology.

Figure 6:
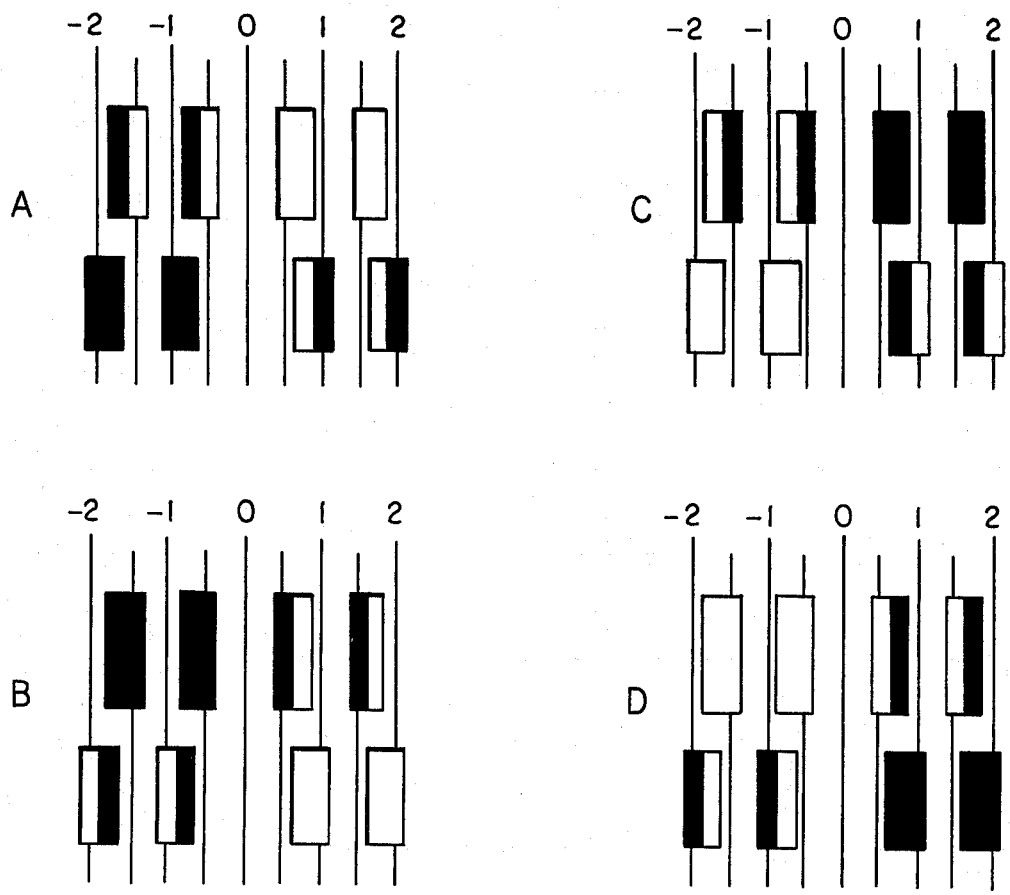
FIG. 6, consisting of A-D, is a series of graphic representations of the operational states of the sensor assembly depicted in FIG. 5.
Figure 7:
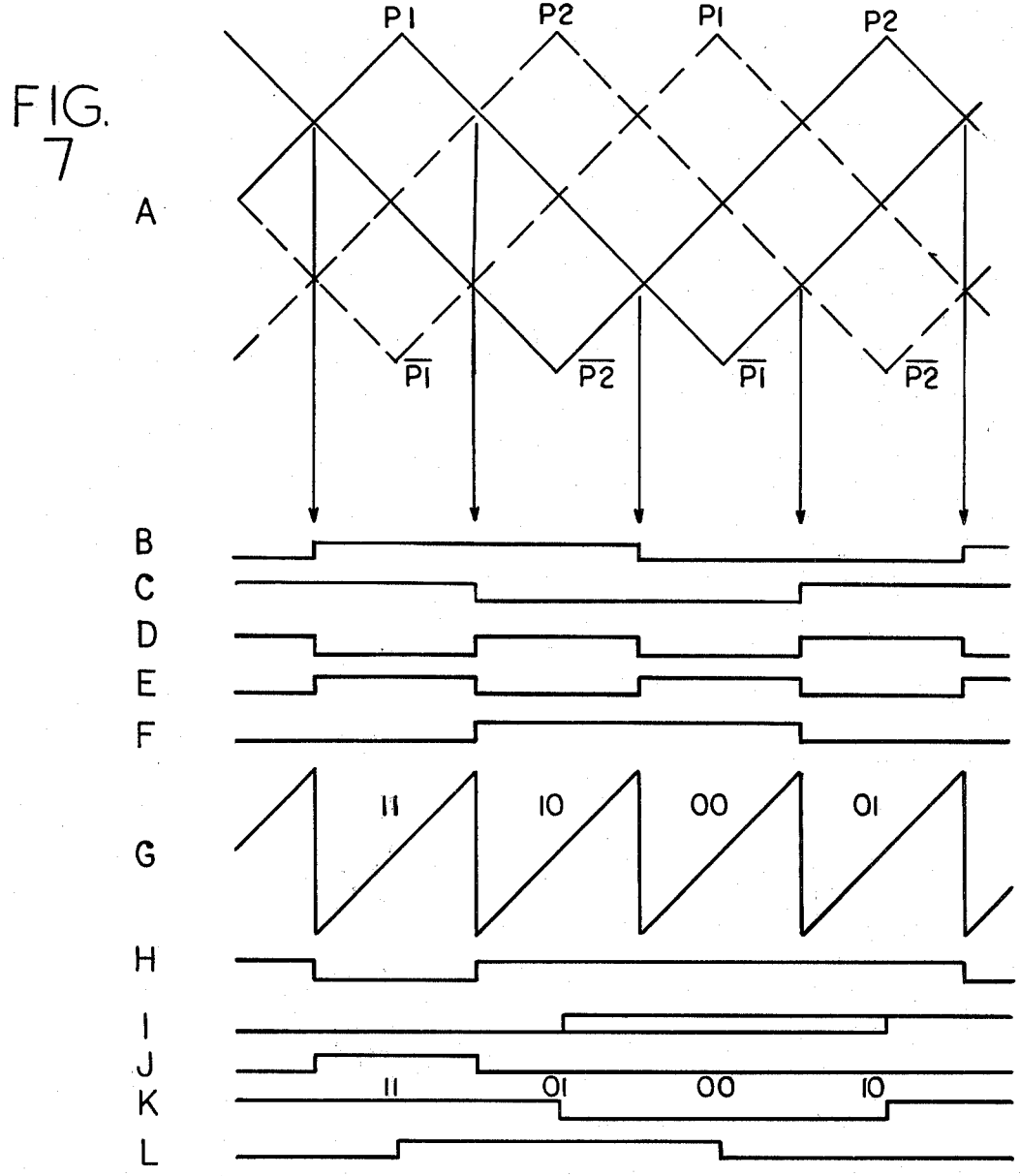
FIG. 7, consisting of A-L, is a waveform diagram of the control signals generated by the FIG. 1 system in response to the FIG. 4 sensor.

A coarse head position electro-optical transducer includes a controlled current light emitting diode source 32, a scale 34 having a series of equally closely spaced microscopic radial lines, and an integrated circuit photo sensitive reticle-masked array 36, which in combination produce the light and dark polyphase (e.g. quadrature) patterns depicted in FIG. 6 and are used to generate the sawtooth servo waveform depicted in FIG. 7.

There are five outputs from the photo sensitive array 36. Four of the outputs are quadrature track position signals which are processed by the differential amplifiers 38 and 40. The fifth is a signal which indicates location of the head 30 at track zero (i.e. the radially outermost useable data track) and it is amplified and shaped by an amplifier 42. The quadrature signals from the differential amplifier 38 and 40 are supplied to a position linearity switch detector circuit 44 which provides the waveforms depicted in FIG. 7 B and C, and also to a position signal selector circuit 46, the operation of which is controlled by the switch detector circuit 44.

Figure 5:
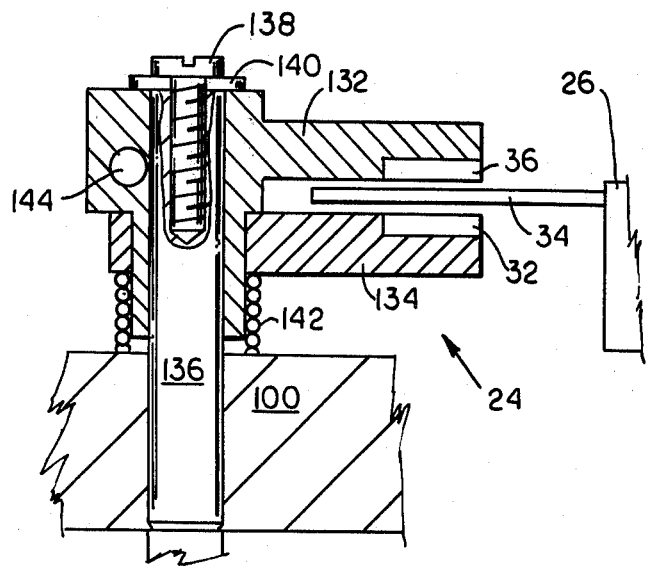
FIG. 5 is an enlarged sectional view in side elevation of the coarse head position sensor assembly of the system depicted in FIG. 1.

As depicted diagrammatically in FIG. 1, structurally in FIG. 5, optically in FIG. 6 and electrically in FIG. 7, the scale 34 rotates with the head structure 28 relative to the frame. With this rotation the scale microlines pass between and interrupt the light beams passing from the source 32 to the detector array 36. With the geometry of the detector array 36 being in accordance with the FIG. 6 sketches, four data tracks may be defined by each microline and space.

The geometry of the light sensitive photodiode array 36 is depicted in FIG. 6. Actually there are four pairs of detector windows, which are radially offset by a distance of a half of a microline. Each window pair sees four phases of each line: first half line, full line (full dark), last half line, and no line (full light). The window pairs are further paired together diagonally. For example the top left window pair and the bottom right window pair provide the two differential inputs to the amplifier 38, and the bottom left and top right pairs are the inputs to the amplifier 40. In FIG. 6A equal and oppositely phased light and dark areas in the upper left and lower right detector pairs provide a null output defining one track. In FIG. 6B the scale has moved to the next phase so that full lines are now seen in the top left windows. In this situation the bottom left and top right are equal and opposite, and the amplifier 42 is at null point defining the next data track. In FIG. 6C the scale has moved yet another half line width and the third phase pattern presented is the same as FIG. 6A except for phase reversal. In FIG. 6D the scale has moved still another half line width to the fourth phase pattern, similar to the FIG. 6B pattern except for phase reversal.

The output of the position linearity switch detector 44 is depicted as the FIG. 7-B and C waveforms. The output from the position signal selector 46 is an analog value which is supplied to a summing network 48, and then on through a loop compensation (damping) network 50, a bidirectional moving coil motion driving amplifier 52 and ultimately to the armature of the rotor 26 via a bidirectional rotation driving line 54. The analog value produces a correction torque to keep the heads 30 within the boundaries of each data track defined by the scale 34 and photodetector 36. The light emitting diode light source 34 is powered by a driver circuit 56 which includes an automatic light level (AGC) control developed from a sixth photodetector in the detector array 36.

The data read by one of the transducers 30 is selected, preamplified and low pass filtered by the circuits denoted by the block 58 of FIG. 1. Thereafter, the reproduced MFM formatted data is recovered by a data recovery circuit 60 and sent to the computer or other appliance to which the system 10 is connected for random access data storage and retrieval.

Figure 2:
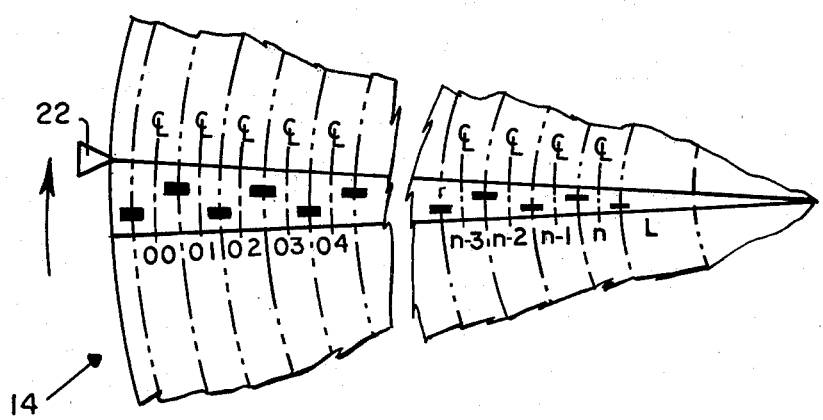
FIG. 2 is an enlarged and diagrammatic plan view of a wedge shaped portion of the rigid disk, illustrating the single servo sector pattern for inner and outer tracks, with the middle tracks broken away to save drawing space.
Figure 3:
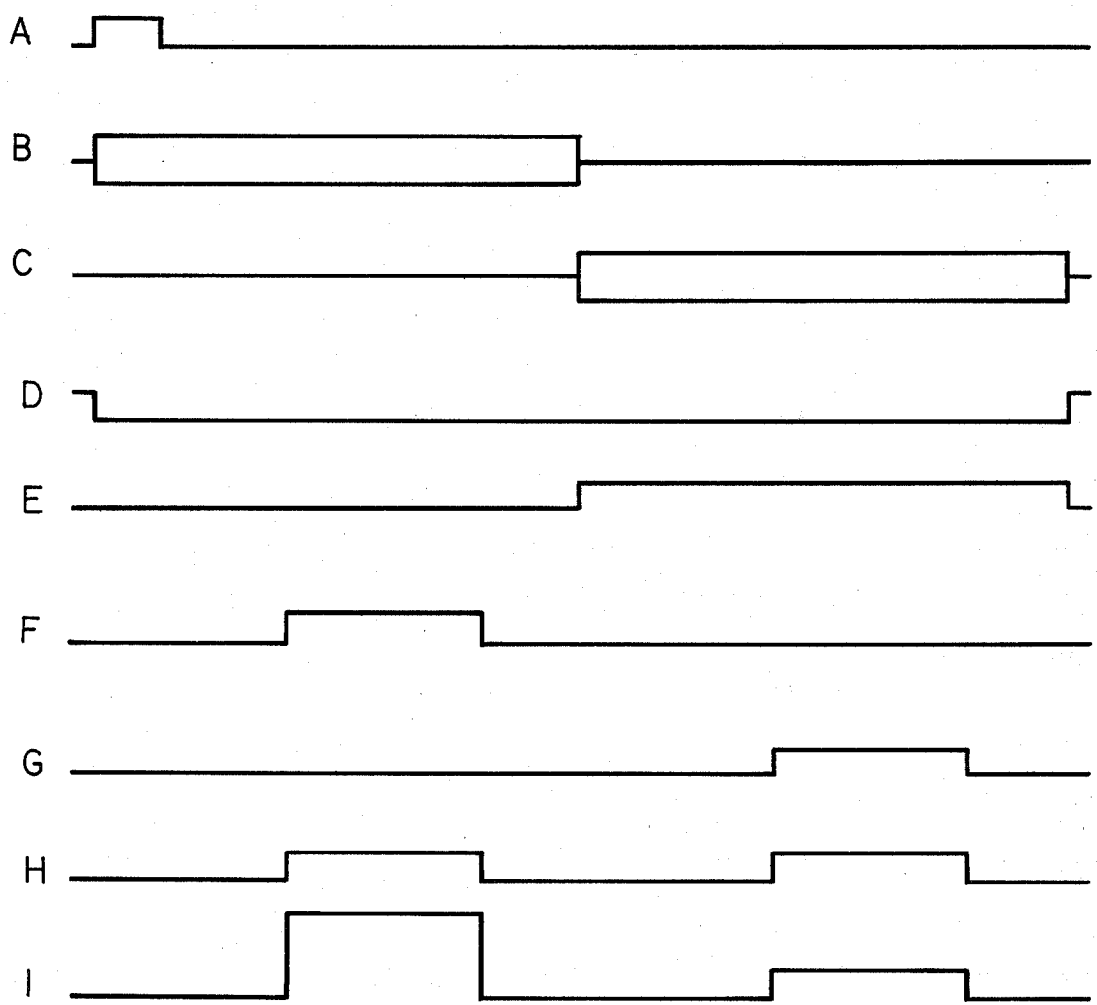
FIG. 3, consisting of A-I, is a series of timing and waveform diagrams related to the operation of the system in response to sensing the track servo sector information depicted in FIG. 2.

One disk surface 14 may be provided with a narrow, 200 byte wide sector 62, which is depicted diagramatically in FIG. 2 and electrically by the FIG. 3 waveforms. Each data track, from track zero zero to track n (e.g. track 511) is provided with the two factory prerecorded frequency bursts, a first occurring burst B1 on the outside half of e.g. odd tracks (and inside half of e.g. even tracks), and a second occuring burst B2 on the inside half of odd track (outside on even tracks). The sector bursts are read each revolution by the head 30 and are used to provide a fine head position servo loop control signal to the rotor 26 in the form of an offset voltage to urge the head 30 into alignment with the centerline of the track. Each burst is read in turn and integrated by the peak detector 66 to provide the amplitudes thereof. These amplitudes are then sampled and held by circuits 68 and 70. The held values are compared by an analog data selector 72, and a signed analog difference is converted to an eight bit digital value by an analog to digital converter 74. This digital value is processed in a digital system controller microprocessor 76, such as the Intel type 8048 which contains a 1k byte factory preprogrammed read only program memory and a 128 byte random access scratchpad memory.

A detector 78 detects the index mark on the drive spindle 12 with each revolution. This index clock signal is passed through an amplifier 80 and sent to the microprocessor 76 to provide a digital tachometer to determine whether the disks are rotating at correct speed and to mark the location in time of the servo sector on the disk. The index clock is also processed by a servo sample timer 82 which is used to enable and switch between the sample and hold circuits 68 and 70.

The waveforms of FIG. 3 illustrate the operation of the circuit elements 30, 58, 64, 66, 68, 70, 72, 74, 76, 78, 80, and 82 which provide the fine position servo. Waveform A depicts the 50 Hz index pulse I generated by the index detector 78. Waveforms B and C depict the first occurring Burst 1 and second occurring Burst 2. Waveform D depicts the servo sector data window which immediately follows each index pulse. Waveform E shows the control signal from the servo sample timer 82 as it is applied to the sample and hold circuits 68 and 70: it divides the sector into two 100 byte halves. Waveform F shows the amplitude of a first burst A stored in the first sample and hold circuit 68. Waveform G shows the amplitude of the second burst B stored in the second sample and hold circuit 70. Waveform H depicts equivalence of sensed amplitudes which obtains when the head is properly aligned within one data track. In this situation no offset value is required and none will be supplied by the microprocessor 76 to the rotor 26. Waveform I depicts a much larger first burst than second burst which indicates the head is not on center but is close to an edge of the track.

It will be appreciated by inspection of FIG. 2 that servo bursts on innermost tracks n-3, n-2, n-1 and n are much smaller in amplitude than bursts on outermost tracks 00, 01, 02, 03, and 04. Consequently, in order to calculate a valid offset signal for fine position servo purposes, it is necessary to calculate the percentage of difference between burst amplitudes with the microprocessor 76. This calculation automatically provides an automatic gain control (AGC) signal for each track, a signal which may be applied to the data recovery circuit 60 or to other circuits for providing gain equalization for recovered data.

A disk drive interface circuit 88 receives control information from the host computer, etc. and supplies that information, including track seek data to the microprocessor 76. Data surface/head select information is sent directly to the head select circuit 58. The microprocessor 76 always knows where the head is presently located because of a two bit quadrature signal line from the switch detector 44. The microprocessor 76 determines how far and in what direction to move the head (seek) and then it calculates a set of numbers which are put out in a sequence dependent upon actual head position during the seek operation.

Figure 4:
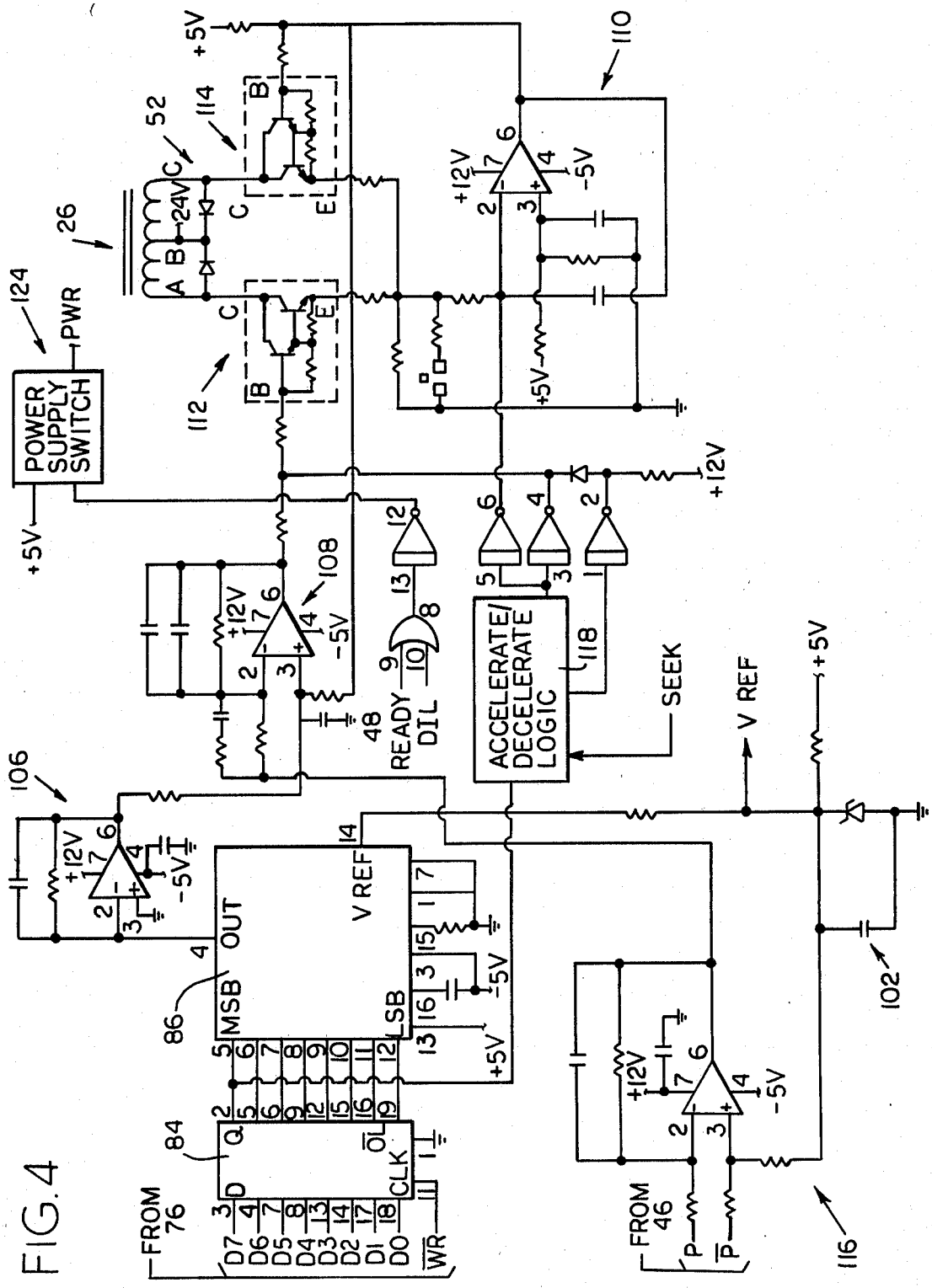
FIG. 4 is a block and schematic diagram of some of the circuitry of the system depicted in FIG. 1.

Some of the major elements of the coarse position closed loop servo and the digital override circuitry are depicted in FIG. 4. Therein, the latch 84 is depicted as a standard TTL type 74LS374 latch which is clocked by an input from the WRITE line of the microprocessor 76. The digital to analog converter (DAC) 86 is implemented as a Motorola type MC1408L8, and it receives the latched 8 bit digital numbers of offset values from the latch 84 and converts them to control currents. A voltage reference circuit 102 is utilized to reference the DAC to system voltages. An operational amplifier current to voltage converter 106 buffers and scales the resultant analog control voltage from the DAC 86. The summing circuit 48 in the implementation depicted in FIG. 4 occurs at the input of the driving amplifier 52 which is supplied with the analog offset voltages from the DAC 86 and the coarse servo loop voltages from the position signal selector 46.

The circuitry of the bidirectional driving amplifier 52 emulates the operation of a differential output amplifier. To do this, the circuitry includes two amplifiers 108 and 110 wired as shown in FIG. 4. The analog controls to the driving amplifier 52 occur at the input of the op amp 108, and the digital seek override controls are applied directly to the inputs of two Darlington pair power drivers 112 and 114 which drive the two windings A-B and B-C of the rotor. (See discussion of FIG. 11, below). The op amp 110 functions to make the characteristics of the driver 114 opposite and complementary to the input of the driver 112.

An operational amplifier 116 receives two complementary coarse servo loop control signals P and bar P from the position signal selector 46. These values are equal and opposite and of minimum amplitude when the head carriage 28 is in general alignment within any given defined track. The P and bar P values are derived by the position signal selector 46 from the digital quadrature waveforms K and L depicted in FIG. 7.

An accelerate and decelerate combinatorial logic array 118 accepts a two bit word derived from the high order data bit clocked from the latch 84, and a binary control line from the microprocessor 75 designated the SEEK enable line. The logic 118 provides digital outputs which are buffered and inverted and are then applied to the input of the power amplifier 112 via a line 120 and to the inverted input of then amplifier 114 via a line 122 (and the inverting op amp 110.) The power amplifiers 112 and 114 may be implemented as type TIP 140 power Darlingron pairs which are thermally sumped into a cast aluminum frame 100 (FIG. 9) of the system 10. The operational amplifiers 106, 108, 110, and 116 may be type 741, or equivalent.

A power supply switch 124 switches on the power supply to the amplifier 52 only when it concurrently receives three enabling signals: a signal indicating presence of the required supply voltages, a READY control signal from the microprocessor 76, which denotes that the disks 14, 16 are spinning at operating velocity, and an Drive Inhibit Line signal. In the event of a loss of operating velocity, power supply potential, or in case of a system reset, power is removed from the driver amplifier 52, and the head carriage assembly 28 automatically returns to the inner landing zone in response to a bias spring 194 (FIG. 9) which operates in default of the rotor 26.

The individual circuit components depicted in FIG. 4 are connected as shown and will not be discussed further, since the values and connections are readily derived by those skilled in the art.

Referring to FIG. 1, an eight bit data word output from the microprocessor 76 is supplied to a data latch 84 which is clocked by the WRITE enable line of the microprocessor 76. Each eight bit number held in the latch 84 is converted to an analog value by the digital to analog converter 86. The high order latched bit, along with another control line direct from the microprocessor 76, is applied directly to the driving amplifier 52 so as to override the coarse position servo system (elements 24, 38, 40, 44, 46, 48, 50) during the maximum accelerative and declerative phases of a track seek operation. In the final phase of track seek, a predetermined velocity slewing rate is achieved by recurrent number series which are converted to analog values by the converter 86 and applied to the summing circuit 48. During the initial maximum accelerative and decelerative step function portion, the coarse servo loop is completely overriden. At about eight tracks from destination track, the maximum deceleration command is removed just before the carriage assembly 24 ceases to move. Thereafter, the coarse servo is commanded to slew across each track by a progressive analog staircase signal which is reset to zero with each detected track crossing. In this way, the coarse servo, under the command of the microprocessor 76, operates solely upon the position information derived from the transducer 24 and irrespective of actual instantaneous velocity of the head carriage assembly 24.

Figure 8:
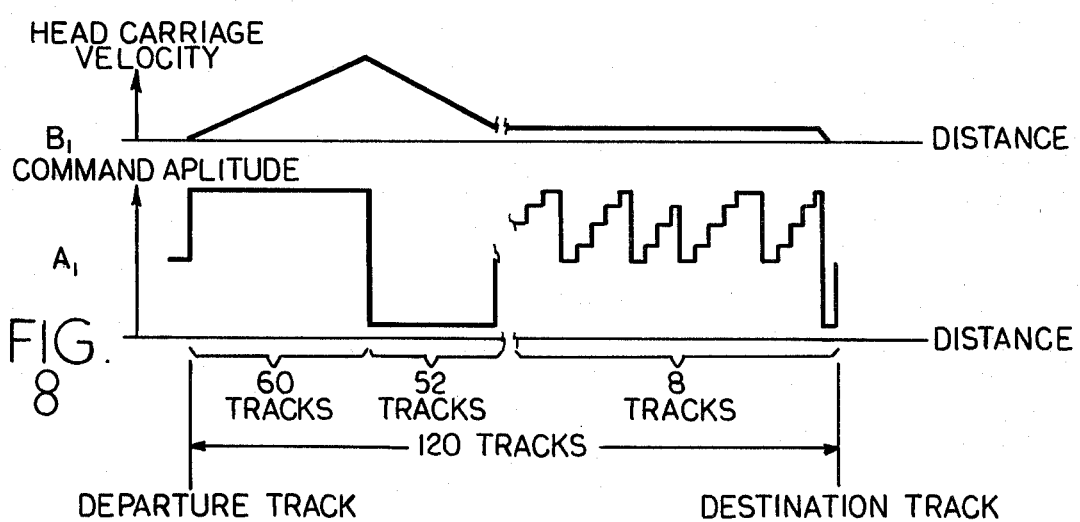
FIG. 8 is a waveform diagram depicting operation of the system of FIG. 1 during a track seeking operation of approximately 120 tracks in radial distance.

If a track crossing occurs sooner than expected, then the staircase command resets to zero before a maximum value is reached. If a track crossing is delayed, then the staircase reaches and holds its maximum value until the transition. These conditions are illustrated in FIG. 8A.

Finally, a short deceleration step function may be applied to stop the carriage assembly 24 at the destination track should its velocity not then have reached zero. FIG. 8A depicts the digital and analog waveform utilized to command a track seek across e.g. 120 tracks. FIG. 8B portrays the velocity of the head carriage 24 relative to radial distance across the 120 tracks.

When the destination track has been reached, the system 10 enters a track extension control mode. One implementation of this mode is to select the appropriate monophase of the quadrature signal and servo over its full cycle (i.e. a distance of plus or minus two tracks). In this way the radial range of servo loop control covers a full four tracks, and only in the event that the head structure 28 is significantly jarred or otherwise is externally caused to move beyond plus or minus two tracks, will the coarse servo lose control. Upon a loss of servo control the system 10 enters a reset mode which resets the system and then returns the head 30 to the last selected track.

The microprocessor 76 has essentially five modes of operation or tasks: initialization, fine servo offset supervision, track seeking, emulation of other disk drive products, and self diagnostics. In the initialization or start up mode when power is first applied, the microprocessor 76 counts index pulses and compares them with an internal clock, to be sure that the disk spindle 12 is rotating at the proper velocity (50 Hz). The head 30 is initially located in a nonabrasive landing zone L (FIG. 2). The microprocessor 76 initially commands a seek to the outermost track (track 00). When the head 30 reaches this outermost track, a special output is obtained from the transducer 24 through the amplifier 42 (FIG. 7-J). The microprocessor 76 then calibrates the fine servo by measuring, establishing and remembering offsets for the four outermost tracks 00, 01, 02, 03, and then for the four innermost tracks n-3, n-2, n-1, n. If there is any difference in initial calibration between the outermost and innermost tracks, the microprocessor spreads this difference e.g. linearly over the total number of tracks of the system. The microprocessor 76 then commands the head 30 back to track 00. Initialization is then complete.

During read and write operations, the microprocessor 76 reads the fine servo continuously and updates the offset, to take into account position errors such as thermal expansion of the disks 14, 16 as internal ambient temperatures rise.

As already explained, the microprocessor 76 receives seek commands digitally from the host computer via the disk drive interface 88. The microprocessor 76 maintains head position data in a register which counts the tracks from information derived from the coarse position transducer 24. The difference between the track at which the head is presently located and the track sought, together with the sign value of the difference, which indicates the direction of head movement required to accomplish the seek, is used to calculate the series of commands from the microprocessor 76 to the rotor 26.

The emulation function of the microprocessor 76 enables the system 10 to emulate the characteristics of other disk drives. One such emulation would be of the SA 1000 eight inch disk drive manufactured by Shugart Associates, a XEROX Corporation subsidiary located in Sunnyvale, Calif. The SA 1000 product utilizes two adjacent read/write heads, and the microprocessor 76 enables the system 10 to appear to a user as if two heads are actually physically present in the system. This emulation is readily provided by redefining the track counting structure in the microprocessor 76 into two series of interleaved odd and even tracks, and then reading odd tracks as though it were with one of the heads, and reading even tracks as though it were with the other of the heads. Other competitive disk drive equipment may be emulated by special programming of the microprocessor 76.

The self diagnosis function of the microprocessor 76 has short term and long term aspects. During operation, the microprocessor 76 constantly monitors disk rotating speed and head position. In the event of a discrepancy in either parameter, the microprocessor takes the disk out of service and informs the host machinery of the detection of an error. Other errors and error messages are easily included, including those particularly adapted to a data format or end use. Diagnostic routines may be contained in the read only memory of the microprocessor 76 or they may be recorded on one or more of the tracks of the disk 14, and called by the microprocessor 76 as required.

Referring now to FIG. 5, the coarse head position servo transducer 24 is depicted in enlarged structural side elevation and vertical cross section. The transducer 24 is a U-shaped assembly comprising an upper member 132 which supports the photodetector and reticle array 36, and a lower member 134 which is keyed to hold the LED light source 32 in vertical alignment with the photodetector 36. The scale 34 is a glass member having equally spaced apart chrome microlines deposited thereon. It is precisely and securely attached to the head support structure 28 e.g. at the rotor 26. The transducer 24 is mounted on a post 136 embedded in the cast aluminum frame 100 which securely supports all of the disk drive machinery.

A feature of the present invention is that the transducer 24 is adjustable in two dimensions with but one point of attachment to the frame 100. A vertical height setting screw 138 and lock washer 140 enables the members 132 and 134 to be adjusted up and down, so that the photodetector can be adjusted to within five thousandths of inch of the scale 34 to achieve the required resolution. A spring 142 biases the members 132 and 134 away from the frame 100.

Sideways alignment of the transducer 24 with respect to the scale 34 is achieved by rotating the members 132 and 134 about the axis of the post 136. A locking screw mechanism 144 locks the members 132 and 134 the post 136 at the desired sideways alignment.

Figure 9:
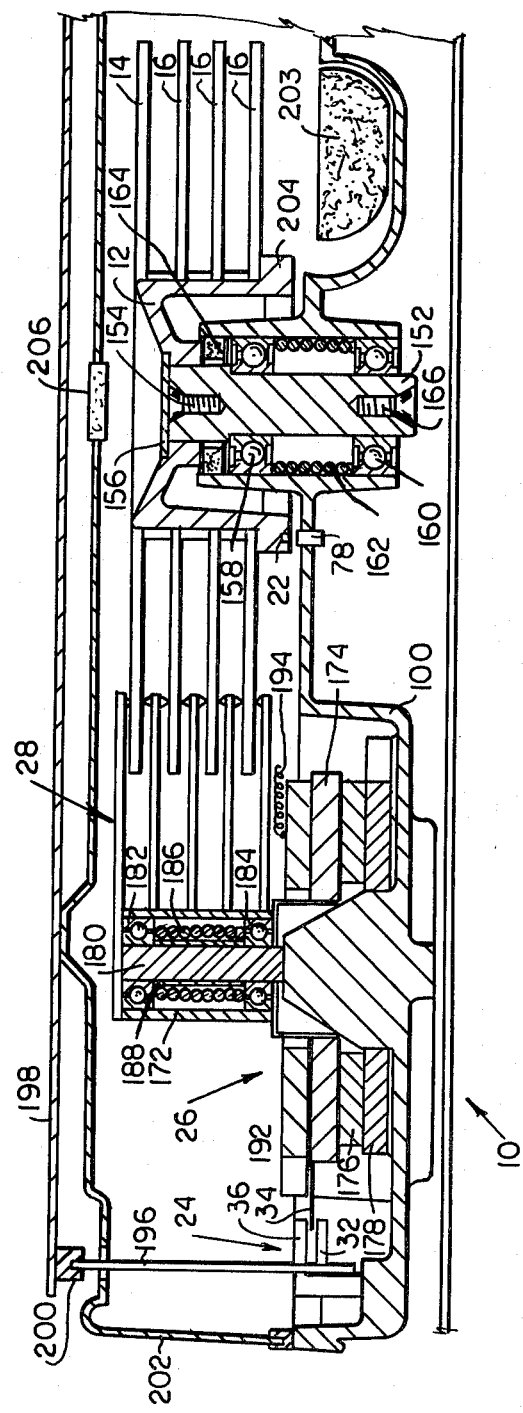
FIG. 9 is a somewhat diagrammatic view in side elevation and vertical section of a disk drive and head carriage assembly in accordance with the principles of the present invention.

The structural configuration of the system 10 is depicted in FIG. 9. Therein the drive hub 12 supports four disks, a top servo sector containing disk 14 and three lower disks 16. The index detector 22 is provided in a lower outer flange of the spindle 12, and the sensor 78 is secured through the frame 100. The spindle 12 is mounted to a spindle shaft 152 by a screw 154 and a washer 156. Ball bearing assemblies 158, 160 are placed in a cylindrical portion of the frame 100 and are held in a spaced apart configuration by a spring 162. A magnetic fluid seal 164 is placed above the bearing 158 and seals the bearings by magnetic cohesion of the sealing fluid. A bottom screw 166 secures a pulley, not illustrated, to the shaft, for the drive belt 20 from the motor 18.

Figure 10:
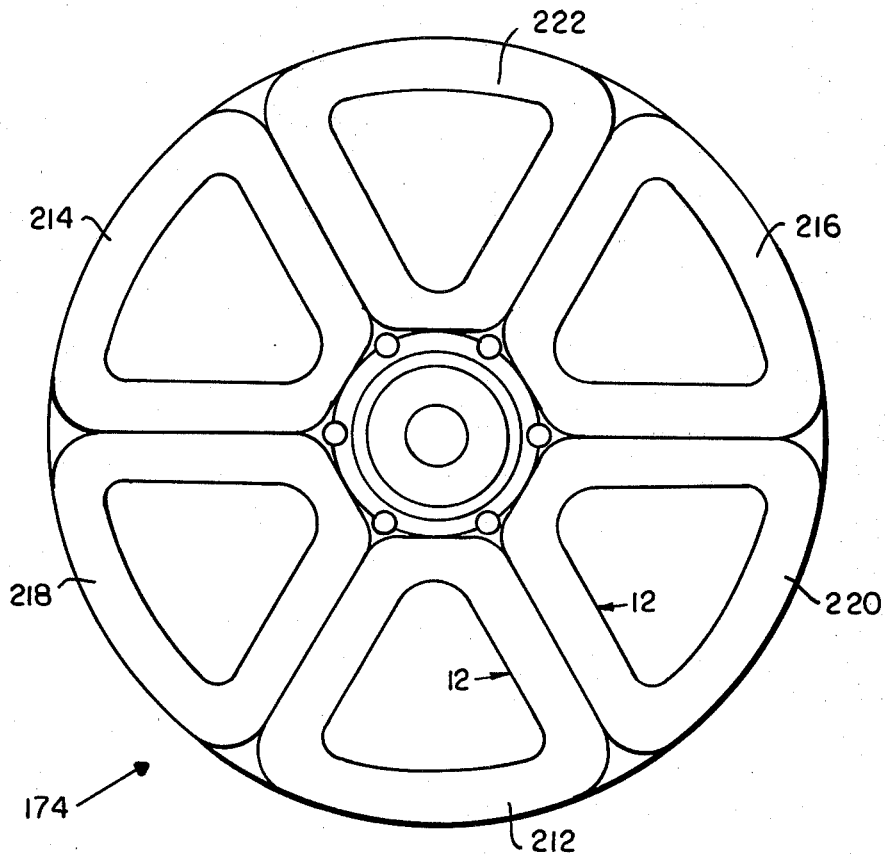
FIG. 10 is a top plan view of the hexagonal wirewound rotor of the head carriage assembly depicted in FIG. 9.
Figure 11:
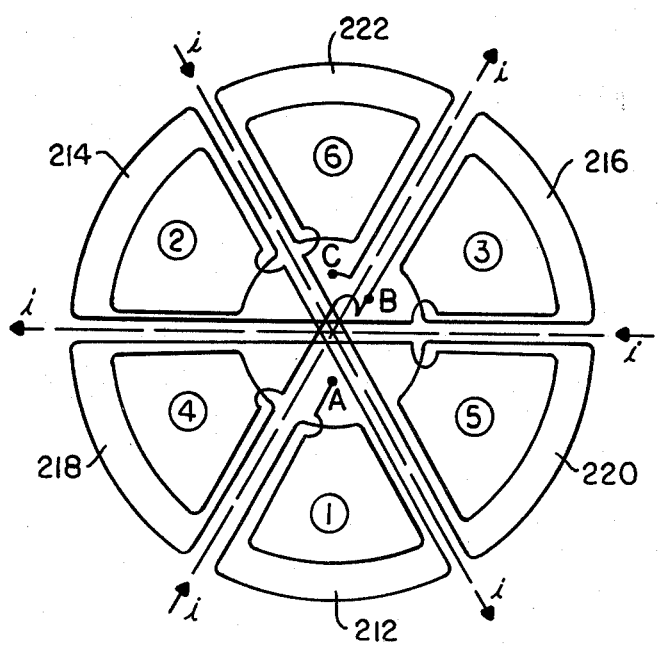
FIG. 11 is a schematic wiring diagram of the wirewound rotor of the head carriage assembly depicted in FIG. 9.

The rotor 26 is depicted in FIGS. 9, 10, 11 and 12. In the FIG. 9 vertical cross section, the rotor 26 includes a hub 172 to which the head structure assembly 28 is mounted. A flat coil assembly 174 is secured by a bonding means such as adhesive to the base of the hub 172. Immediately below the coil assembly 174 is a ferroceramic permanent magnet 176 which is fabricated as a unitary structure and then magnetized into a series of adjacent even-number opposed field magnetic segments in which the north and south poles alternate at the top and bottom of the magnet 176. The number of separate segments in the magnet 176 corresponds to the number of coil windings in the coil assembly 174. As shown in FIGS. 10 and 11 there are e.g. six coil windings, as there are e.g. six separate magnetic segments in the magnet 176. An annular flux return plate 178 of low carbon steel forms a base for the magnet 176. In fabrication, a ceramic blank is glued to the base plate 178 and then the resultant structure is permanently magnetized. A fixed shaft 180 extends from a ribbed portion of the frame 100. The hub 172 is journaled to the shaft 180 by ball bearing assemblies 182 and 184 which are initially held in place during fabrication by an axial preload spring 186 and spacer 188, with adhesive locking the bearings 182, 184 to the hub 172.

A flux return top plate 192 is secured to the frame 100. A bias spring 194 extends from a standoff on the top plate 192 to the head carriage assembly 28 and biases it to return to the inner landing zone of the disks when power is removed from the rotor 26. Crash stops may be formed in the top plate 192 to limit range of head structure travel.

Other elements depicted in FIG. 9 include a printed circuit board 196 which carries the circuitry immediately associated with the optical transducer 24 including the elements 38, 40, 42 and 56 depicted in FIG. 1 and also the wiring connection for the heads 30. A main printed circuit board 198 carrying the rest of the circuitry of FIG. 1, is plugged into the board 196 at a plug 200. A plastic case 202 mates with the base 100 and provides an airtight seal throughout which is required for the reliable operation of flying head Winchester drive technology. An air filter 203 fits into a recess of the frame, and fins 204 extending from the flange at the base of the spindle 12 force air within the plastic enclosure 202 to pass through the filter 203. A breather filter 206 enables internal and external pressures to equalize.

Figure 12:
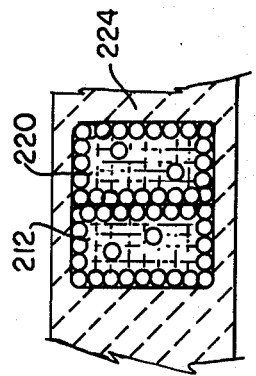
FIG. 12 is a view in side elevation and section of a portion of the wirewound rotor depicted in FIG. 10 taken along the line 12—12.

To develop balanced torque or what we call "pure torque", which minimizes loading of bearings 182, 184, and enables very inexpensive bearings to be utilized, we have developed a coil assembly 174 comprising six separate coil windings 212, 214, 216, 218, 220, 222, each of which is generally triangular as shown in the FIG. 10 plan view and all of which may be wound from a single continuous wire strand, as shown schematically in FIG. 11. Three coils 212, 214, 216 are series connected together per the FIG. 11 schematic (A to B), while the other three coils 218, 220 222 are series connected together (B to C) in opposite phase to the first three coils. It will be appreciated that the rotor 26 must rotate in both directions. Use of two sets of opposed geometrically symmetrical coils enables this movement through a simple switching of the power supply from one winding set to the other. Each coil segment may be wound upon a generally triangular bobbin, the three connections A, B, C, established and then leads connected and extending to the outside. Each segment, in cross section (FIG. 12) is approximately nine turns across by 22 turns high, of 29 gauge copper wire. The coil assembly 174 is then placed in a forming mold, and an epoxy potting compound 224 is then placed and pressed into the mold to form the assembly 174 (FIG. 12). Adhesive is used to bind the coil assembly 174 to the hub 172. By utilizing potting compound 224 to form the assembly 174, a very high mechanical resonant frequency is achieved, and the assembly 174 dampens resonant vibration otherwise occuring in the head structure 28, thereby increasing the mechanical bandwidth of the coarse servo loop.

The coil assembly 174 is configured so that adjacent coil windings will produce equal and opposite forces resulting in a pure torque evenly applied about the axis of rotation of the rotor 26. If equal currents are present in both sides of the coil assembly 174 (A to B and C to B) these forces cancel, and there is no resultant torque produced. During seeking, in the event of any position error or disturbance occuring while the system 10 is operating in the closed loop track following or slewing modes, the current in the winding becomes imbalanced, and this condition yields a restoring torque which moves the head structure until a position yielding equalibrium in current is again reached.

Counterweights, not shown, are added to the rotor hub 172 to place the center of mass of the head structure 28 in alignment with the axis of rotation of the rotor 26. In this way, no unbalanced forces pass through the rotor bearings 182 and 184 as the rotor rotates about its axis.

It will be apparent to those skilled in the art that the present invention may be embodied physically in a wide variety of ways and with many different elements and components. For example, the optical transducer 24 may be implemented magnetically. Alternatively, transducer information may be provided in the servo sector 62 and read with each rotation of the disk 14. The rotor 26 may be replaced with an electrical detent, microstep providing stepping motor, and the combination of such a stepping motor with the time sampled fine servo loop will vastly improve track centerline following performance in a disk drive. The servo loop systems of the present invention are advantageously, but not necessarily, embodied in rotating magnetic disk storage devices. Other servo applications, such as in spectrophotometers and other machines characterized by highly interactive mechanical elements are within the scope of the present invention.

Having thus described an embodiment of the invention, it will now be appreciated that the objects of the invention have been fully achieved, and it will be understood by those skilled in the art that many changes in construction and circuitry and widely differing embodiments and applications of the invention will suggest themselves without departure from the spirit and scope of the invention. The disclosures and the description herein are purely illustrative and are not intended to be in any sense limiting.

We claim:

1. In a data storage device including a frame, a data storage disk journalled to the frame and rotatingly driven by motor means at a constant velocity and characterized by a multiplicity of concentric data tracks on a major surface thereof, at least one data transducer head structure in close proximity to said disk surface, the improvement comprising:

a bidirectionally rotatable electromechanical rotor journalled to said frame adjacent to said disk, a head mounting structure securing said head at one end thereof and secured to said rotor at the other end thereof for moving said head across said multiplicity of concentric data tracks, directional rotor driver means connected to said rotor for rotating said structure to maintain it within a selected data track during read and/or write operations and to move said structure from a departure track to a destination track during track seeking operations, a head position transducer providing a polyphase position signal in response to sensed actual position of said head structure relative to said frame, head controller means connected to said head position transducer, said rotor driver and to an external source of track selection information, for recording the present track position of said head structure, for calculating a track seeking command in response to known head position and said track selection information, and for commanding said head to move from a known departure track to a requested destination track during a track seeking operation by commanding at said rotor a first head position spatial increment of maximum forward direction acceleration followed by a similar head position spatial increment of maximum reverse direction acceleration and then by commanding adaptively a slewing rate dependent upon said polyphase incremental head structure position information from said head position transducer until said destination track is reached, a position dependent closed loop servo connected to said head position transducer and to said rotor driver for operatively controlling said driver to keep said head positioned within a selected one of said data tracks during read and/or write operations, said loop being open during track seeking operations until occurrence of adaptively commanded slewing, a fine position closed loop servo connected to said driver and further including a single, data masked servo sector on a data surface of said disk containing track centerline servo control data therein readible by a head of said structure adjacent to said surface, a sample and hold circuit connected to said head during passes over said sector for holding control data read therefrom, and correction signal generator means for generating an offset signal for application to said driver to promote and maintain track centerline alignment of said head during read and write operations, said fine position loop being opened during track seeking operation.

2. In a data storage device including a frame, a data storage disk journalled to the frame and rotatingly driven by motor means at a constant velocity and characterized by a multiplicity of concentric data tracks on the major surfaces thereof, at least one data transducer head in close proximity to a said disk surface, the improvement comprising:

a bidirectionally moveable electromechanical mover supported by said frame adjacent to said disk being moveable between and stabilized at a position related to each said data track, a head mounting structure securing said data transducer head at one end thereof and secured to said mover at the other end thereof for moving said head across said multiplicity of concentric data tracks, bidirectional mover driver means connected to said mover and capable of moving said structure to any selected one of said concentric data tracks in accordance with externally supplied track position information and of maintaining said structure substantially within said selected data track during read and/or write operations by reference to said frame, data track stabilization means including said mover for stabilizing said structure within a range between the boundaries of each said data track, a time sampled fine position closed loop servo connected to said driver and including a single, data masked servo sector on a data surface of said disk containing track centerline servo control data therein readible by said head, a sample and hold circuit connected to said head during passes over said sector for holding control data read therefrom, and correction signal generator means connected to said sample and hold circuit for generating an offset signal for application to said driver means to promote and maintain track centerline alignment of said head during read and write operations.

3. In a data storage device including a frame, a disk drive motor secured to the frame and connected to a source of electricity, a magnetic data storage disk rotatingly driven by said drive motor at a constant velocity and characterized by a multiplicity of concentric data tracks on at least one major surface thereof, and at least one read and write head held in close proximity to said disk surface by air bearing effect, the improvement comprising:

a bidirectionally rotatable electromechanical rotor journalled to said frame adjacent to said disk and having an axis of rotation parallel with the axis of said disk, a beam securing said head at one end thereof and secured to said rotor at a counterbalanced axis of rotation near the other end thereof for arcuately moving said head across said multiplicity of concentric data tracks, bidirectional rotor driver means connected to said rotor for rotating said beam to maintain said head within a selected data track during read and/or write operations and to move said head from a departure track to a destination track during track seeking operations, a head position transducer mechanically linked to said beam and responsive to absolute position of said head relative to said frame and providing track position signals in quadrature, head controller means connected to said head position transducer, said rotor driver and to an external source of track selection information, for recording the track position of said head, for calculating a track seeking command in response to known head position and said track selection information, and for commanding said head to move from a known departure track to a requested destination track during a track seeking operation by commanding at said rotor a first head position spatial increment of maximum forward direction acceleration followed by a similar head position spatial increment of maximum reverse direction acceleration and then by commanding adaptively a slewing rate dependent upon incremental quadrature crossing head position information from said head position transducer until said destination track is reached, a position dependent closed loop servo connected to said head position transducer and to said rotor driver for operatively controlling said driver to keep said head positioned within a selected one of said data tracks during read and/or write operations, said loop being opened during track seeking operations, a fine position closed loop servo connected to said driver and further including a single, data masked servo sector on said disk containing track centerline servo control data therein readible by said head, a sample and hold circuit connected to said head during passes over said sector for holding control data read therefrom, and correction signal generator means for generating an offset signal for application to said driver to promote and maintain track centerline alignment of said head during read and write operations, said fine position loop being opened during track seeking operations.

4. The data storage device set forth in claim 1 or 3 wherein said head controller means comprises a programmed microprocessor having a head position data input connection from said head position transducer, a binary data latch for receiving and holding said track seeking command, said microprocessor clocking said latch in accordance with position information derived from said transducer and said external source of track selection information, a data connection from said latch directly to said driver means for enabling said controller means to command said acceleration increments in said track seeking operations, a digital to analog converter connected to said latch for converting slewing commands clocked into said latch into analog values and for applying said analog values to said position dependent closed loop servo to command said driver means to slew said head securing beam structure at said position-adaptive slewing rate.

5. The data storage device set forth in claim 2 or 3 wherein said fine position closed loop servo comprises a pair of prerecorded track marking signals in said servo sector for each said defined track, a first occuring marking signal being radially offset in one direction from track centerline, and a second occurring marking signal being radially offset in the other direction from track centerline, first sample and hold means for sampling and holding the amplitude of said first occurring marking signal with each revolution of said disk, second sample and hold means for sampling and holding the amplitude of said second occurring marking signal with each revolution of said disk, and differential comparator means connected to said first and second sample and hold means for comparing held amplitudes and for generating a head position correction signal proportional to the difference in held amplitudes, and for applying said correction signal to said rotor through said driver means.

6. The data storage device set forth in claim 5 wherein said differential comparator generates an automatic gain control signal for automatically controlling and regulating amplitudes of data recovered in read operations of said disk by operatively regulating data recovery circuits of said data storage device.

7. The subject matter as set forth in claim 1 or 3 wherein said position transducer comprises:
a scale having equally spaced angular apertures defined thereon, and secured to one of said frame and structural elements moved by said rotor,
a unitized, generally U-shaped structure having two parallel arms spaced apart for a distance slightly greater than the thickness of said scale and aligned and mounted to the other of said frame and said structural elements moved by said rotor so that said scale is free to pass between said arms, said structure including
a light source in one of said arms for passing light through said scale and in the direction of the other said arm,
an array of photosensitive detectors and a light-pattern-defining reticle placed between said detectors and said scale in the other of said arms, said reticle defining windows for said detectors which are so spaced as to provide said polyphase signal in quadrature as said scale moves between said arms.

8. The subject matter set forth in claim 7 wherein said scale is secured to said structural elements moved by said rotor and said U-shaped structure is secured to said frame at a single location of attachment and is adjustable with respect to said frame in two spatial dimensions.

9. The subject matter as set forth in claim 1 or 3 wherein said rotor comprises a bidirectional, pure torque generating electromechanical rotor rotably mounted to a frame and rotatingly moving a member relative to said frame over a locus defining a sector of a circle, which is less than 90 degrees, said rotor comprising:
a flux return base plate,
a flux return top plate,
a generally annular permanent magnet secured to one of said base and top plates and characterized by an even number plurality of adjacently opposed field magnetic segments in which the north and south poles alternate at the major surfaces thereof,
a generally annular, rotatable coil assembly placed and closely spaced from between said permanent magnet and the other of said base and top plates, said coil assembly containing the same even number plurality of coils as there are magnet segments in said permanent magnet, said coils being aligned adjacent to said magnetic segments at at least one position of rotation of said assembly, said coils being connected into two series of opposed windings equidistantly and symmetrically located about said assembly,
a moving member attached to said assembly and rotatably passing through at least one of said base plate and top plate, said member being rotated along said locus by passage of current through one of said series, said torque from said coils being applied evenly to said moving member about its axis of rotation.

10. The electromechanical rotor set forth in claim 9 wherein said rotor has been rotationally aligned relative to said magnet to linearize torque amplitude over the range of said locus of movement.

11. In a data storage device including a rotating rigid magnetic medium data storage disk, a read and write head held in close proximity to the surface of said disk by the air-bearing effect, and a head carriage mechanism for positioning said head at one of a multiplicity of concentric data tracks during data read and/or write operations in substantially unrestricted data format within each track and for moving said head from track to track during track seeking operations of said device, the improvement comprising:

driver means drivingly connected to said head carriage mechanism for arcuately moving said head from one track to a selected other track located beyond a predetermined minimum radial distance during an opened loop servo track seek movement characterized by a first spatial increment of maximum forward direction acceleration of said carriage for about half the radial distance between said tracks and by a second similar increment of maximum reverse direction acceleration until said mechanism reaches reaches the vicinity of said selected other track, and for closed loop generally constant velocity microstepping of said mechanism within said minimum radial distance in small radial increments from track to track until said other track is reached, and for maintaining said head accurately within a selected track during data read and write operations, a summing circuit connected to drive said driver means, coarse servo control loop means including coarse position sensor means mechanically linked to said carriage mechanism for sensing radial position of said head relative to said tracks, and coarse position feedback control loop means connected to said driver means through said summing circuit for controlling said driver means to keep said head positioned within each said selected one of said defined tracks during read and write operations, index detector means electromechanically coupled to said disk for detecting each rotation thereof and generating an index signal, fine position servo control loop means including a single data-masked servo sector region on the surface of said disk containing servo information therein, sample and hold means connected to said head for sampling and holding said servo information read in said servo sector for each revolution of said disk, correction signal generator means connected to said sample and hold means for generating offset signals, and analog to digital converter means connected to said correction signal generator means, for converting said offet signals into digital values, programmed digital microprocessor means connected to said analog to digital converter means, said index detector means, said coarse servo control loop means and to a source of an externally supplied digital track selection command signal, and including clocked latch means, and digital to analog converter means drivingly connected to said driver means through said summing network for calculating and supplying a digital head positioning signal directly to said driver means in order to move said head from a predetermined departure track to a predetermined destination track, said head positioning signal overriding said summing circuit during acceleration phases of track seeking operations, for calculating and supplying a track microstepping head positioning signal to said driver means through said digital to analog converter means and said summing network during track seek microstepping, and for calculating and applying a fine position offset signal to said driver means through said digital to analog converter means and said summing network to maintain said head in centerline alignment in said track during read and/or write operations interactively with said coarse servo control loop means.

12. In a data storage method including the steps of rotating a data storage disk at a constant velocity, providing a multiplicity of concentric data tracks on the major surfaces thereof, reading and/or writing data from and to said tracks with at least one data transducer head structure in close proximity to said disk surfaces, and moving said structure from a departure track to a destination track during track seeking operations, the improved method comprising:

moving said head structure across said multiplicity of concentric data tracks with a bidirectionally rotatable electromechanical rotor journalled to said frame adjacent to said disk and secured to said rotor at the other end thereof, rotating said structure with bidirectional rotor driver means connected to said rotor to maintain said head within a selected data track during read and/or write operations and to move said head from a departure track to a destination track during track seeking operations, providing a polyphase signal responsive to position of said head structure relative to said frame with a head position transducer, providing track selection information to head controller means connected to said head position transducer, said rotor driver and to an external source of track selection information, and then recording the track position of said head structure, calculating a track seeking command in response to known head position and said track selection information, commanding said head to move from a known departure track to a requested destination track during a track seeking operation by commanding at said rotor a first head position spatial increment of maximum forward direction acceleration followed by a similar head position spatial increment of maximum reverse direction acceleration and then by commanding adaptively a slewing rate dependent upon incremental head structure position information from said head position transducer until said destination track is reached, and operatively controlling said driver to keep said head positioned within a selected one of said data tracks during read and/or write operations with a position dependent, coarse position closed loop servo connected to said head position transducer and to said rotor driver and overriding said coarse position loop to keep it open during track seeking operations, providing a fine position closed loop servo connected to said driver and further including:
providing a single, data masked servo sector on a data surface of said disk,
prerecording track centerline servo control data in said servo sector,
reading said data with a head of said structure adjacent to said surface,
sampling and holding data read by said head during passes over said sector and generating an offset correction signal, applying said offset signal to said driver to promote and maintain track centerline alignment of said head during read and/or write operations, and overriding said fine position servo loop during track seeking operations.

13. The data storage method set forth in claim 12 and further comprising the steps of providing a pair of prerecorded track marking signals in said servo sector for each said defined track by providing a first occurring marking signal radially offset in one direction from track centerline, and providing a second occurring marking signal radially offset in the other direction from track centerline, separately sampling and holding the amplitudes of said first and second occurring marking signals, and comparing said held amplitudes and generating therefrom a head position correction signal proportional to the difference in held amplitudes of said marking signals, and applying said correction signal to correct head position until it coincides with track centerline.

14. The data storage method set forth in claim 13 and further comprising the additional step of utilizing said comparison of held amplitudes to generate an automatic gain control signal for automatic control and regulation of amplitude of recovered data.

15. The data storage method set forth in claim 12 wherein said step of operatively controlling said driver to keep said head positioned within a selected one of said data tracks during read and/or write operations with a position dependent, coarse position closed loop servo includes the step of providing a track extension control mode by selecting an appropriate monophase of said polyphase position responsive signal and servoing over its full cycle.

16. The data storage method set forth in claim 12 further comprising an emulation step for emulating operation of a disk drive having two adjacent read/write heads, said step comprising electrically assigning odd numbered tracks to correspond with tracks read by one of said emulated adjacent heads and electrically assigning even numbered tracks to correspond with tracks read by the other of said emulated adjacent heads.

17. In a data storage device including a frame, a data storage disk journalled to the frame and rotatingly driven by motor means at a constant velocity and characterized by a multiplicity of concentric data tracks on the major surfaces thereof, at least one data transducer head structure in close proximity to said disk surfaces, the improvement comprising:
   a bidirectionally moveable electromechanical mover mounted to said frame adjacent to said disk,
   a head mounting structure securing said head at one end thereof and secured to said mover at the other end thereof for moving said head across said multiplicity of concentric data tracks,
   bidirectional mover driver means connected to said mover for moving said structure to maintain it within a selected data track during read and/or write operations and to move said structure from a departure track to a destination track during track seeking operations,
   a head position transducer providing a polyphase position signal in response to sensed actual position of said head structure relative to said frame,
   head controller means connected to said head position transducer, said mover driver and to an external source of track selection information, for recording the present track position of said head structure, for calculating a track seeking command in response to known head position and said track selection information, and for commanding said head to move from a known departure track to a requested destination track during a track seeking operation by commanding at said mover a first head position spatial increment of maximum forward direction acceleration followed by a similar head position spatial increment of maximum reverse direction acceleration and then by commanding adaptively a slewing rate dependent upon said polyphase incremental head structure position information from said head position transducer until said destination track is reached,
   a position dependent closed loop servo connected to said head position transducer and to said mover driver for operatively controlling said driver to keep said head positioned within a selected one of said data tracks during read and/or write operations, said loop being open during track seeking operations until occurrence of adaptively commanded slewing,
   a time sampled fine position closed loop servo connected to said driver and further including a single, data masked servo sector on a data surface of said disk containing track centerline servo control data therein readible once per disk revolution by a head of said structure adjacent to said surface, a sample and hold circuit connected to said head during passes over said sector for holding sampled control data read therefrom, and correction signal generator means for generating an offset signal for application to said driver through said position dependent closed loop servo to promote and maintain track centerline alignment of said head during read and write operations, said fine position loop being opened during track seeking operations.

18. In a data storage device including a frame, a data storage disk journalled to the frame and rotatingly driven by motor means at a constant velocity and characterized by a multiplicity of concentric data tracks on the major surfaces thereof, at least one data transducer head structure in close proximity to said disk surfaces, the improvement comprising:
   a bidirectionally moveable electromechanical mover mounted to said frame adjacent to said disk,
   a head mounting structure securing said head at one end thereof and secured to said mover at the other end thereof for moving said head across said multiplicity of concentric data tracks,
   bidirectional mover driver means connected to said mover for moving said structure to maintain it within a selected data track during read and/or write operations and to move said structure from a departure track to a destination track during track seeking operations,
   data track stabilization means including said mover for stabilizing said structure within a range between the boundaries of each said data track,
   head controller means connected to said mover driver means and to an external source of track selection information, for commanding said mover to move said head from a known departure track to a requested destination track during a track seeking operation until said destination track is reached,
   a time sampled fine position closed loop servo including said head controller means and further including a single, data masked servo sector on a data surface of said disk containing track centerline servo control data therein readible once per revolution by a head of said structure adjacent to said surface, a sample and hold circuit connected to said head during passes over said sector for holding sampled control data read therefrom, and correction signal generator means for generating an offset signal for application to said driver means through said position dependent closed loop servo to promote and maintain track centerline alignment of said head during read and write operations.

19. The data storage device set forth in claim 18 wherein said fine position closed loop servo comprises a pair of prerecorded track marking signals in said servo sector for each said defined track, a first occuring marking signal being radially offset in one direction from track centerline, and a second occurring marking signal being radially offset in the other direction from track centerline, first sample and hold means for sampling and holding the amplitude of said first occurring marking signal with each revolution of said disk, second sample and hold means for sampling and holding the amplitude of said second occurring marking signal with each revolution of said disk, and differential comparator means connected to said first and second sample and hold means for comparing held amplitudes and for generating a head position correction signal proportional to the difference in held amplitudes, and for applying said correction signal to said mover through said driver means.

20. The data storage device set forth in claim 19 wherein said differential comparator generates an automatic gain control signal for automatically controlling and regulating amplitudes of data recovered in read operations of said disk by operatively regulating data recovery circuits of said data storage device.

21. In a data storage method including the steps of rotating a plurality of commonly journalled rigid data storage disks at a constant velocity, providing a multiplicity of aligned concentric data track locations on data storage major surfaces of said disks, reading and/or writing data from and to said tracks with commonly mounted data transducers held in close proximity to said disk surfaces by air-bearing effect, and moving said structure from a departure track to a destination track during track seeking operations, the improved method comprising:
providing a bidirectionally moveable electromechanical mover for maintaining each said transducer within a selected data track location during read and/or write operations and for moving said transducer from a departure track location to a destination track location during track seeking operations,
providing a transducer position encoder for generating a polyphase signal responsive to position of said mover relative to said frame and for providing binary track boundary marking signals,
providing a reference track signal corresponding to a reference track location,
providing at least one servo sector on a said surface with prerecorded track centerline servo control data for each data track location in the form of a first occurring marker burst of constant frequency radially offset in one direction from track location centerline and a second occurring marker burst of constant frequency radially offset in the opposite direction from track location centerline,
providing track selection information from an external source,
providing controller means including programmed digital microprocessor means for:
determining track location of said transducers by calibrating a digital track counter with said reference track signal and by incrementing and decrementing said track counter with said binary track boundary marking signals as said mover moves said transducers away from and toward said reference track,
calculating a track seeking command in response to present track location of said transducers and said track selection information,
commanding said mover to move said transducers from a known departure track location to a selected track location during a track seek operation by commanding said mover to accelerate for a first spatial increment of movement and to decelerate for a second spatial increment of movement and by commanding adaptively a slewing rate dependent upon said binary track boundary marking signals from said transducer encoder until said destination track is reached,
operatively controlling said mover by a control servo to keep said transducers positioned in substantial alignment with track location centerline of a selected one of said data track locations during data read and/or write operations, by repeatedly:
separately reading and holding peak amplitude values of said first and second occurring marker bursts,
comparing said held values to provide an offset signal,
calculating a transducer position correction signal from said offset signal, and
applying said correction signal to said mover to correct transducer position to track centerline alignment.

22. The data storage method set forth in claim 21 further comprising initial track centerline calibrating steps of:
calculating and recording head position correction signals for a plurality of tracks lying in an outwardly lying band of tracks,
calculating and recording head position correction signals for a plurality of tracks lying in an inwardly lying band of tracks,
averaging said correction signals of said outward tracks, and averaging said correction signals of said inward tracks, and
spreading the difference between said two averages uniformly over the tracks lying between said two bands.

23. In a data storage device including a frame, a plurality of non-removeable rigid rotating data storage disks commonly journalled to said frame, a plurality of data transducers travelling in close proximity to each major data storage and retrieval surface of each said disk upon an air-bearing cushion, and electrically powered transducer mover means for commonly moving said transducer among aligned concentric data track locations of said surfaces in response to externally supplied track selection information, an improved transducer mover control system comprising:
reference track sensor means for sensing a reference track location, transducer position encoder means for generating a polyphase signal responsive to position of said transducer mover means relative to said frame and for providing binary track boundary marking signals, at least one servo sector on a said surface having prerecorded track centerline servo control data for each data track location in the form of a first occurring marker burst of pr etermined frequency radially offset in one direction from track centerline and a second occurring marker burst of predetermined frequency radially offset in the opposite direction from track centerline, controller means comprising programmed digital microprocessor means, memory means, analog to digital converter means, and digital to analog converter means, said controller means having data inputs connected to said reference track sensor means, said transducer position encoder means, and a said transducer reading said servo sector bursts, and having a control output connected to said mover means, said controller means for:

recording track location of said transducers and including a digital track counter initialized by a signal from said reference track sensor means and which is incremented and decremented by said binary track boundary marking signals as said mover means moves said transducers relatively away from and toward said reference track, calculating a desired track seek command from recorded present track location and said externally supplied track selection information, commanding said mover means to move said transducers from said presently recorded track location to said desired track location, including means for commanding said mover means to accelerate for a first spatial increment of movement and to decelerate for a second spatial increment of movement and for commanding said mover means to move at an adaptive slewing rate dependent upon said binary track boundary marking signals until said desired track location is reached by said transducers, closed loop servo means for controlling said mover means to keep said transducers positioned in substantial alignment with track centerline of each selected data track location during read and/or write operations, and further comprising:

peak amplitude detection and holding means for reading and holding peak amplitude values of said first and second occurring marker bursts, comparator means for comparing said held peak amplitude values to generate an offset signal, correction signal calculation means for calculating a transducer position correction signal from said offset signal, and correction signal application means including said digital to analog converter means for applying said correction signal to said mover means to correct transducer position to achieve track centerline alignment.

24. The subject matter set forth in claim 23 wherein said transducer position encoder means comprises:

a scale having equally spaced angular apertures defined thereon, and secured to one of said frame and said mover means, a unitized, generally U-shaped structure having two parallel arms spaced apart for a distance slightly greater than the thickness of said scale and aligned and mounted to the other of said frame and said mover means so that said scale is free to pass between said arms, said structure including:

a light source in one of said arms for passing light through said scale and in the direction of the other said arm, an array of photosensitive detectors and a light-pattern-defining reticle placed between said detectors and said scale in the other of said arms, said reticle defining windows for said detectors which are so spaced as to provide said polyphase signal in quadrature as said scale moves between said arms.

25. The subject matter set forth in claim 24 wherein said scale is secured to said mover means and said U-shaped structure is secured to said frame at a single location of attachment and is adjustable with respect to said frame in two spatial dimensions.

26. The subject matter set forth in claim 23 wherein said mover means comprises a bidirectional, pure torque generating electromechanical rotor rotatably mounted to a frame and a transducer support structure rotatingly moved by said rotor over a locus relative to said frame which defines a sector of a circle less than 90 degrees.

27. The subject matter set forth in claim 26 wherein said rotor comprises:

flux return base plate means, flux return top plate means, permanent magnet means being secured to at least one of said base and top plate means and characterized by a plurality of adjacently opposed field magnetic segments in which the north and south poles alternate at the major surfaces thereof, rotatable coil assembly means placed and closely spaced adjacent to said permanent magnet means, said coil assembly containing the same even number of coils as there are magnetic segments in said permanent magnet means, said coils being aligned adjacent to said magnetic segments at at least one position of rotation of said assembly means, said coils being connected into two series of opposed windings equidistantly and symmetrically located about said assembly, said transducer support structure being attached to said assembly means and rotatably passing through at least one of said base plate and top plate means, said support structure being rotated along said locus by passage of current through one of said series, said torque from said coils being applied evenly to said support structure about its axis of rotation.

28. The electromechanical rotor set forth in claim 27 wherein said rotor has been rotationally aligned relative to said magnet means to linearize torque amplitude over the range of said locus of movement.

* * * * *

Disclaimer 4,396,959.—*Joel N. Harrison*, Campbell; *Donald V. Daniels*, Santa Cruz and *David A. Brown*, Saratoga, Calif. DATA TRANSDUCER POSITION CONTROL SYSTEM FOR ROTATING DISK DATA STORAGE EQUIPMENT. Patent dated Aug. 2, 1983. Disclaimer filed Apr. 27, 1984, by the assignee, *Quantum Corp.*

Hereby enters this disclaimer to claims 21, 22, 23, 24, 25, 26, 27 and 28 of said patent.

[*Official Gazette February 3, 1987.*]